United States Patent [19]

Bournay, Jr. et al.

[11] Patent Number: 4,573,766
[45] Date of Patent: Mar. 4, 1986

[54] LED STAGGERED BACK LIGHTING PANEL FOR LCD MODULE

[75] Inventors: Frederick M. Bournay, Jr.; Joel F. Giurtino, both of Miami, Fla.

[73] Assignee: Cordis Corporation, Miami, Fla.

[21] Appl. No.: 562,855

[22] Filed: Dec. 19, 1983

[51] Int. Cl.⁴ .................... G02F 1/133; G09F 9/00; G09F 9/30; F21V 7/04
[52] U.S. Cl. ..................... 350/345; 40/448; 340/716; 362/26; 362/31
[58] Field of Search .......... 350/345, 331 R; 362/19, 362/23, 26–31, 800; 340/716; 40/442, 448, 546, 452, 451

[56] References Cited

U.S. PATENT DOCUMENTS

| | | | |
|---|---|---|---|
| 3,023,304 | 8/1958 | Peterson | 362/31 |
| 3,729,626 | 4/1973 | Thurlow | 362/31 |
| 3,864,905 | 2/1975 | Richardson | 58/50 |
| 3,869,196 | 3/1975 | Aldrich et al. | 350/160 |
| 3,881,809 | 5/1975 | Fergason et al. | 350/160 |
| 3,994,564 | 11/1976 | Somogyi | 350/160 |
| 4,017,155 | 4/1977 | Yagi et al. | 350/160 |
| 4,042,294 | 8/1977 | Billings, Jr. et al. | 350/160 |
| 4,043,636 | 8/1977 | Eberhardt et al. | 350/160 |
| 4,088,992 | 5/1978 | Kmetz et al. | 340/336 |
| 4,090,189 | 5/1978 | Fisler | 315/169.1 |
| 4,126,383 | 11/1978 | Doriguzzi et al. | 350/338 |
| 4,196,581 | 4/1980 | Nemoto | 368/227 |
| 4,310,871 | 1/1982 | Adachi | 350/345 X |

Primary Examiner—John K. Corbin
Assistant Examiner—David Lewis
Attorney, Agent, or Firm—Henry W. Collins; Thomas R. Vigil

[57] ABSTRACT

The LED backlighting panel includes a roughened flat surface area and side edges with holes therein for receiving light emitting diodes that are supplied from a direct current power source which can have an adjustable duty cycle to provide a backlighting panel that has a minimal power consumption in a liquid crystal display (LCD) module.

12 Claims, 6 Drawing Figures

U.S. Patent  Mar. 4, 1986  4,573,766
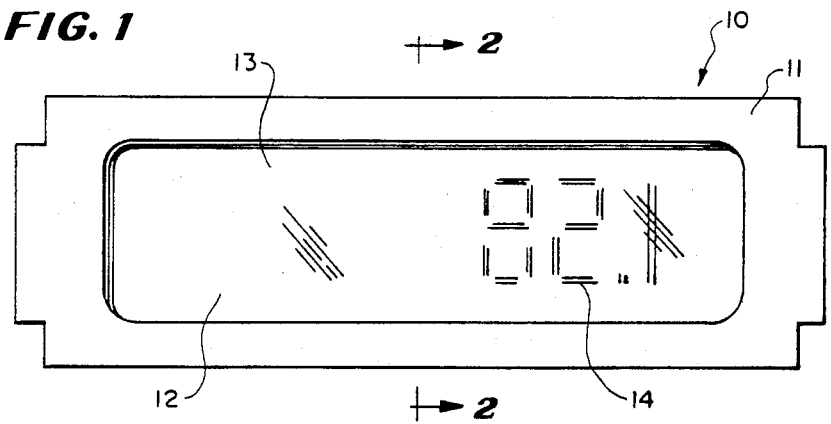
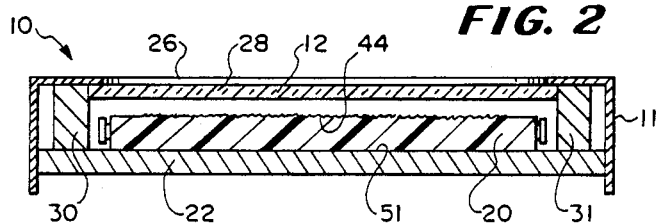
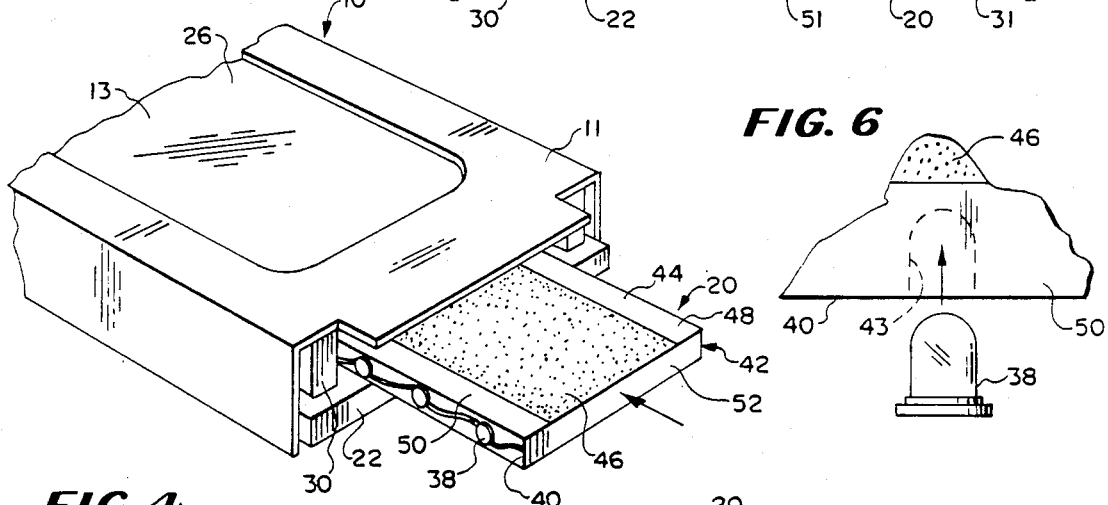
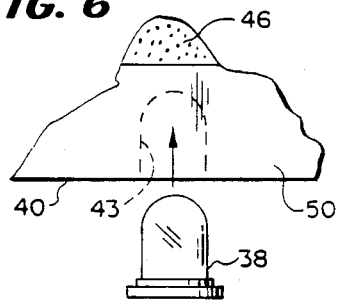
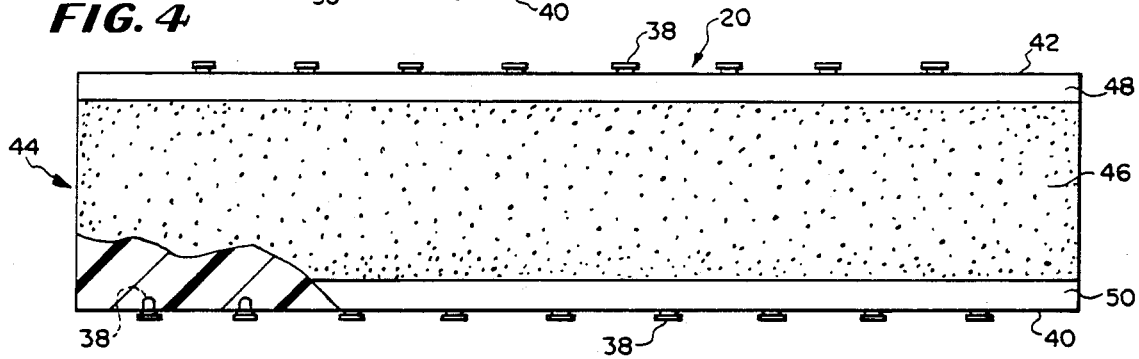
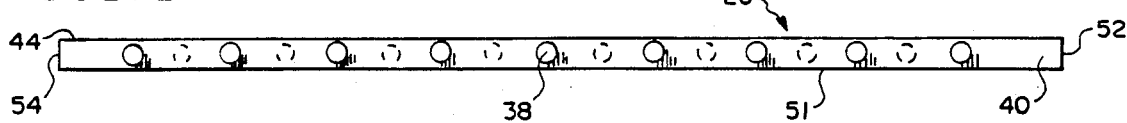

LED STAGGERED BACK LIGHTING PANEL FOR LCD MODULE

BACKGROUND OF THE INVENTION

1. Field of the Invention

The present invention relates to a backlighting panel for an LCD module. More particularly, the invention relates to an LED backlighting panel for an LCD module.

2. Description of the Prior Art

Heretofore various backlighting panels have been proposed. Several of these panels are disclosed in the following U.S. Patents:

| U.S. Pat. No. | PATENTEE |
| --- | --- |
| 3,864,905 | Richardson |
| 3,869,195 | Aldrich et al |
| 3,881,809 | Fergason et al |
| 3,994,564 | Somogyi |
| 4,017,155 | Yagi et al |
| 4,042,294 | Billings, Jr. et al |
| 4,043,636 | Eberhardt et al |
| 4,088,992 | Kmetz et al |
| 4,126,383 | Doriguzzi et al |
| 4,196,581 | Nemoto |

The Richardson U.S. Pat. No. 3,864,905 discloses a liquid crystal horological instrument employing a display comprising a layer of liquid crystal material sandwiched between two transparent parallel plates and incorporating a reflective surface on the side of the display opposite the side which is viewed by the observer. In the absence of ambient light, the display is illuminated by an electric lamp incorporated in the instrument.

The Aldrich et al U.S. Pat. No. 3,869,195 discloses a liquid crystal display containing a segmented source of backlighting, such source comprising a continuous electroluminescent panel sandwiched between transparent electrodes with at least one of the electrodes being segmented to provide high brightness and contrast over a wide range of ambient lighting conditions.

The Fergason U.S. Pat. No. 3,881,908 discloses a reflection system for liquid crystal displays for high efficiency reflection without ghosts or background images. This is accomplished by the use of an LCD of the polarized light shutter type and by the use of a diffuse reflector placed behind a polarized liquid crystal cell. The reflector scatters the light at very large angles to provide a good viewing range while preserving polarization. The result is a gain in contrast lighting.

The Somogyi U.S. Pat. No. 3,994,564 discloses a light pipe reflector for use in a liquid crystal or other display wherein a light pipe formed of optically clear material having a clear, lightly etched, top surface and patterned bottom surface are utilized. An enlarged portion is provided at one edge and contains a cavity for insertion of a light bulb. The light pipe is covered with a highly reflective coating except for the clear top surface and the interior portion of the cavity.

The Yagi et al U.S. Pat. No. 4,017,155 discloses a liquid crystal display device which is very thin and suitable for wrist watches. It comprises upper and lower transparent plates having the liquid crystal material sandwiched therebetween. A reflective plate having a roughened upper surface is disposed beneath the lower transparent plate with the roughened surface facing the lower transparent plate. A light source is located alongside one side edge of the reflective plate and coacts with a light-reflecting hood encasing the display panel. By locating the light source along the side of the reflecting plate and by employing the light reflecting hood, the display device may be made very thin.

The Billings, Jr. et al U.S. Pat. No. 4,042,294 discloses an electro-optical display system including front and rear optically transmissive panels that are spaced apart in substantially parallel configuration. A liquid crystal composition in disposed between the panels and optically transmissive electrodes are disposed on the opposing surfaces of the front and rear panels. The electrodes are attached to electrical leads whereby a voltage can be impressed between selected front and rear electrodes to illuminate the panel, the light source being a luminous radioactive panel or light pipe plate with at least one light source adjacent an edge of the light pipe plate.

The Eberhardt et al U.S. Pat. No. 4,043,636 discloses an illumination panel for the enhancement of brightness of a liquid crystal display for a watch or similar device. The panel has an internal light source which has a suitable shape and a reflectorized coating to direct internal and external light in the desired direction. More particularly, a transparent layer or member with an internal light source is mounted at one end and selectively coated with a metallic reflective material to reflect light from internal and external sources through a cross-hatched surface or a matte finished window on the surface of the member, which is mounted adjacent to the exterior surface of the bottom substrate of the display. Diffused light is transmitted from the internal light source through the bottom substrate of the display.

The Kmetz et al U.S. Pat. No. 4,088,992 discloses an electro-optical display device including a liquid crystal cell arranged between two polarizers. A light source such as an LED is positioned adjacent one polarizer on the side thereof remote from the liquid crystal cell and an electronic control device is coupled to the liquid crystal cell. A diaphragm is arranged on one side of the liquid crystal cell to form an aperture for limiting the display field of the liquid crystal to limit viewing parallex and to improve contrast.

The Doriguzzi et al U.S. Pat. No. 4,126,383 discloses an electro-optic display device which can be operated in either the transmissive or reflective mode. The device consists of a liquid crystal display cell and a semi-transparent reflector located on or in a circuit board having a light emitting element such as a miniature bulb and having at least one light conducting region.

The Nemoto U.S. Pat. No. 4,196,581 discloses a liquid crystal display electronic wristwatch having a lamp therein to illuminate the liquid crystal display mounted in the watch case beneath a display panel so as to overlap with the display.

As will be described in detail below, the backlighting panel of the present invention differs from the previously proposed backlighting panels by providing a panel having a light diffusing surface and light emitting means on two opposite sides thereof. In this way the panel can be illuminated from the edges thereof by a number of direct current powered LED's which require only a small amount of power. The power consumption of the panel will then be lower than the power required for electroluminescent panels which require a high alternating current power supply or additional circuitry for converting direct current to alternating current.

A further decrease in power consumption may be achieved by adjusting the duty cycle of the direct current to the LED's to a frequency which is not detectable by the human eye.

SUMMARY OF THE INVENTION

According to the invention there is provided a thin, single layer backlighting panel for use in a visual display device, such as a liquid crystal display unit, comprising a thin, rectangular piece of light transmitting plastic material having a front surface and a back surface, light emitting means being positioned along and extending into two opposite elongate edges of said rectangular piece of material for emitting light into said piece of material and comprising a plurality of light emitting diodes, said light emitting diodes along and within one edge being staggered or offset from the light emitting diodes along and within the opposite edge, and means on at least the front flat surface of said piece of material for diffusing light at said front flat surface to provide diffused backlight for said visual display device.

Further according to the invention there is provided a method for providing backlighting in a visual display device including: providing a thin rectangular panel of light transmitting material having a flat front surface, a flat back surface, and opposite elongate edges; providing a light diffusing surface area on said front surface of said panel; directing light into said elongate edges of said panel of light transmitting material to cause said light transmitting material to transmit diffused light therfrom through said front flat surface; forming said light emitting means from a plurality of light emitting diodes; and positioning the light emitting diodes on one edge to be staggered or offset from the light emitting diodes along an opposite edge.

BRIEF DESCRIPTION OF THE DRAWINGS

FIG. 1 is a front perspective view of an LCD module having the LED backlighting panel of the present invention disposed therein and shows how a digit appears in the module.

FIG. 2 is a sectional cross-sectional view of the LCD module shown in FIG. 1 and is taken along line 2—2 of FIG. 1.

FIG. 3 is a fragmentary perspective view of an LCD module into which the LED backlighting panel of the present invention is being inserted.

FIG. 4 is a top plan view of the LED backlighting panel of the present invention with a portion broken away to show several light emitting diodes inserted into one side edge of the panel.

FIG. 5 is a bottom edge view of the backlighting panel shown in FIG. 4 and shows the alternate positioning of the LEDs in two opposed side edges of the panel.

FIG. 6 is an enlarged fragmentary view of one side edge of the panel with a light emitting diode positioned for insertion into a hole in the one side edge.

DESCRIPTION OF THE PREFERRED EMBODIMENTS

Referring now to FIG. 1 in greater detail, there is illustrated therein an LCD module which is generally identified by the reference numeral 10. The module 10 includes a housing 11 with a display unit 12 therein, on, or in which, an alphanumeric readout is provided through a window 13.

The backlighting for characters, such as character 14, is provided by an LED backlighting panel 20 constructed according to the teachings of the present invention.

Referring now to FIG. 2, there is illustrated therein a cross section of the module 10 shown in FIG. 1 and is taken along line 2—2 of FIG. 1. Here the position of the LED backlighting panel 20 within the housing 11 is shown. It will be appreciated that the backlighting panel 20 is disposed between a back wall 22 of the housing 11 and the display unit 12. The display unit 12 includes a transparent covering 26 and a conventional liquid crystal display unit 28 therebehind. Also, upper and lower guide walls 30 and 31 are provided in the housing 11 for guiding and positioning the LED backlighting panel 20 within the housing 11.

FIG. 3 shows the panel 20 being moved into the housing 11. In a conventional LCD module a relatively thin electroluminescent panel is inserted into the space in housing 11 between panels 22 and 28 and walls 30 and 31. The panel 20 of the present invention, however, is thicker, the thickness thereof being determined by the diameter of a light emitting diode 38 which is inserted into two opposed elongate side edges 40 and 42 of the panel 20. A plurality of diodes 38, are positioned in respective holes 43 drilled into each side edge 40 and 42.

As shown in FIG. 4, one flat surface 44 has a central surface area 46 which is textured or roughened, such as by sanding, and the adjacent margins 48 and 50, which are also adjacent edges 40 and 42, respectively, are smooth and painted white so that no light can pass through these margins 48 and 50. The surface areas painted can include the back surface 51 and the side edges 40, 42 and 52, 54 of the panel 20.

With the back surface 51 opaque, the only area where light can escape is the textured surface area 46 of the panel 20. This area 46 is lightly sanded in the lengthwise direction thereof to scatter light evenly throughout the surface area 46.

Further, it will be seen from FIG. 4 that a plurality of the light emitting diodes 38 are disposed along the opposite elongate side edges 40 and 42 of the panel 20 and the LED's 38 on one side are staggered relative to the LED's 38 on the other side.

This staggered arrangement is further illustrated in a side elevational view of the panel 20 shown in FIG. 5. Here it will be seen the the LED's 38 on one side edge 42 are disposed halfway between adjacent LED's 38 on the other side edge 40 of the panel 20.

By using LED's 38 for illuminating the panel 20, a direct current can be used rather than an alternating current so that the panel 20 consumes a minimum of power. However, since the LED's s 38 are inserted into side edges 40 and 42 of the panel 20, the panel 20 is thicker than the electroluminescent panels previously utilized for backlighting an LCD module 10.

The power drain can be further minimized by adjusting the duty cycle of the direct current to a frequency which will not present a blinking light to the human eye.

In operation, when the backlighting panel 20 is activated, the light emitting diodes 38 cause the panel to glow in the surface area 46 in a diffuse semiuniform fashion.

When this panel 20 is inserted behind the window 13 of the module 10, the window 13 will light up to make the characters stand out against a lighted background, typically a green or blue green light. The color of light is established by the LED's 38 or by the color of the piece of plastic material used to make the panel 20.

Again, this backlighting will be done more efficiently than in many prior LCD modules using an electroluminescent panel due to the lower power needs of the LED's 38.

From the foregoing description, it will be apparent that the backlighting panel 20 of the present invention has a number of advantages, some of which have been described above and others of which are inherent in the invention.

Accordingly, the scope of the invention is only to be limited as necessitated by the accompanying claims.

I claim:

1. A thin, single layer backlighting panel for use in a visual display device, comprising a liquid crystal display unit, said back lighting panel comnprising a thin, rectangular piece of light transmitting plastic material having a front surface and a back surface and two opposite elongated edges, said two opposite elongated edges having holes therein, light emitting means being positioned along and extending into said holes of said two opposite elongate edges of said rectangular piece of material for emitting light into said piece of material and comprising a plurality of light emitting diodes, a plurality of said light emitting diodes along and within one edge being staggered or offset from a plurality of the light emitting diodes along and within the opposite edge, and means on at least the front flat surface of said piece of material for diffusing light at said front flat surface to provide diffused backlight for said visual display device.

2. The panel of claim 1 wherein said flat rectangular piece of light transmitting material is a thin transparent piece of plastic material and said opposite elongate edges have holes therein for mounting said light emitting diodes.

3. The panel of claim 1 where said diffusing means are defined by a roughened surface area on said front flat surface.

4. The panel of claim 3 wherein said roughened light diffusing surface area is sanded.

5. The panel according to claim 1 wherein the lontitudinal margins adjacent to said opposite side edges are covered with an opaque covering.

6. The panel of claim 5 wherein said opaque covering is white paint.

7. The panel of claim 1 wherein said light emitting diodes are capable of being powered from an adjustable duty cycle source.

8. The panel of claim 1 having a thickness slightly greater than the diameter of each of the light emitting means diodes.

9. A method for providing backlighting in a visual display device including: providing a liquid crystal display unit, providing a flat rectangular panel of light transmitting material having a flat front surface, a flat back surface, and opposite elongate edges; providing a light diffusing surface area on said front surface of said panel; directing light into said elongate edges of said panel of light transmitting material to cause said light transmitting material to transmit diffused light therefrom through said front flat surface thereby backlighting said liquid crystal unit; forming said light emitting means from a plurality of light emitting diodes; and positioning a plurality of the light emitting diodes on one edge to be staggered or offset from a plurality of the light emitting diodes along the opposite edge.

10. The method of claim 1 wherein an adjustable duty cycle direct current is supplied to said light emitting diodes.

11. The method of claim 9 including the step of sanding said surface to provide said light diffusion surface area.

12. The method of claim 9 including covering the elongate margin of said one surface adjacent said opposite side edges with an opaque covering.

* * * * *